March 16, 1948.  R. W. ALLEN  2,438,028
LOCKING MEANS FOR FASTENER STUDS
Filed Dec. 7, 1943
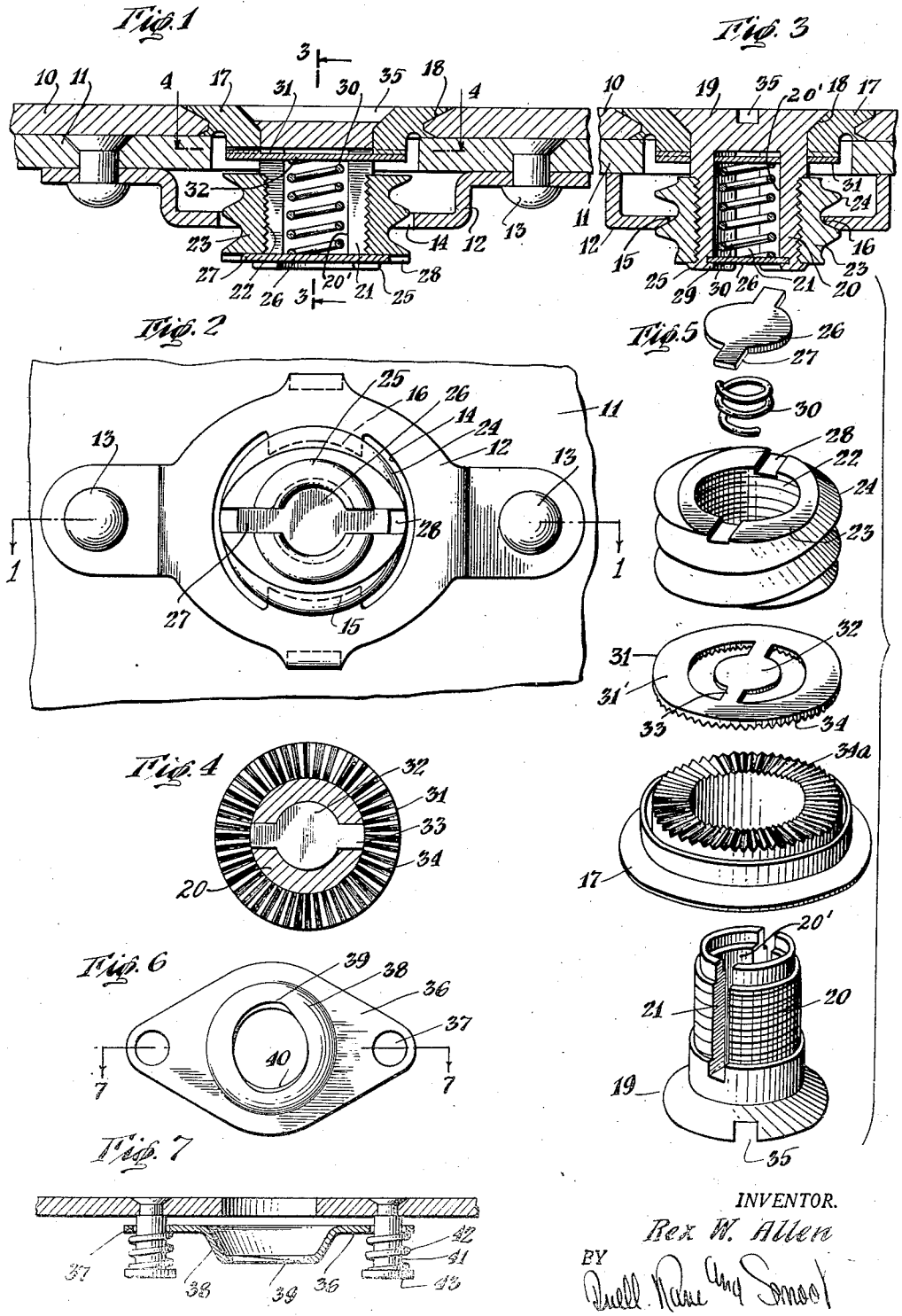
INVENTOR.
Rex W. Allen
ATTORNEYS Patented Mar. 16, 1948

2,438,028

UNITED STATES PATENT OFFICE 2,438,028

LOCKING MEANS FOR FASTENER STUDS

Rex W. Allen, Palisades, N. Y., assignor to Camloc Fastener Corporation, New York, N. Y., a corporation of New York Application December 7, 1943, Serial No. 513,233

4 Claims. (Cl. 24—221)

This invention relates to a structurally and functionally improved fastener and in its more specific aspects aims to provide an assembly of this character which will serve to couple a pair of mounting members or sheets against detachment with respect to each other while at the same time permitting a manipulation of its parts such that these sheets or their equivalents may readily be separated when this is desired.

A further object is that of providing a fastener, the parts of which will remain in proper positions with reference to each other and despite the fact that the sheets or elements mounting the same are subjected to continuous vibration as, for example, in the case of an aircraft installation.

Thus, it is a still further object of the invention to provide in association with a fastener, a locking or retaining structure which, while normally operative to prevent an accidental uncoupling of the parts of the fastener assembly, may readily be manipulated to permit of a manual and deliberate uncoupling of such parts.

Another object is that of providing a structure of this character and which will be relatively simple in design and be capable of manufacture by automatic or semi-automatic methods and machinery; the assembly moreover including relatively few and rugged parts which—in proper association with each other—will operate over long periods of time with freedom from all difficulties.

Among other objects of the invention are those of providing a structure which will not be detrimentally affected by the presence of foreign particles such as dirt and which structure may, moreover, be brought to almost any desired final position and maintained in that position. Additionally, the present invention provides a functionally and structurally improved stud-receptacle.

With these and other objects in mind, reference is had to the attached sheet of drawings illustrating one practical embodiment of the invention, and in which:

Fig. 1 is a sectional side view of a fastener assembly along line 1—1 of Fig. 2 and showing the same in association with mounting elements such as sheets;

Fig. 2 is a bottom plan view thereof;

Fig. 3 is a sectional side view taken along the lines 3—3 and in the direction of the arrows as indicated in Fig. 1;

Fig. 4 is a face view of one of the locking or detent elements;

Fig. 5 is an exploded view showing in perspective the several parts of the assembly;

Fig. 6 is a bottom plan view of an alternative form of worm receptacle; and

Fig. 7 is a sectional side view of such receptacle and showing the same mounted in an alternative manner, the section being taken on line 7—7 of Fig. 6.

Fasteners of this type are ordinarily employed to secure against movement elements which mount them. These elements ordinarily take the form of sheets such as 10 and 11. These sheets are apertured at points in line with those at which the fastener parts are to be mounted and cooperate with each other. One of these parts in the embodiment under consideration might be termed a lug-mounting or worm-engaging collar. It includes a body 12 secured against detachment with respect to sheet 11 by rivets or in any other desirable manner. The central part of the body extends in spaced relationship with respect to sheet 11 and is formed with an aperture 14 in line with the aperture of the sheet. At diametrically opposite points the edges defining the aperture 14 may be extended inwardly, as indicated at 15 and 16, to furnish a pair of opposed lug portions.

The second group or assembly of parts of the fastener includes a mounting member for rotatably supporting said parts with respect to the sheet 10 or its equivalent. This mounting member preferably takes the form of a grommet 17 which is of annular shape and has its parts intimately engaging corresponding and preferably flared surfaces 18 of sheet 10. As illustrated, these flared or countersunk surfaces are provided adjacent the aperture in that sheet. The grommet rotatably supports the head 19 of a stud which may be in the form of a sleeve 20 providing a central bore 20'. The latter may be slotted as at 21 throughout any desired length and preferably as shown throughout its entire body. Its exterior face is conveniently threaded as at 22 to engage with the corresponding threads of a worm 23.

This worm has upon its outer face a thread 24 which may be a single or a multiple thread. The diameter of the convolutions of this latter thread are such that it will cooperate with the inwardly extending lugs 15 and 16. Relative movements between the worm and stud or sleeve are prevented by conveniently extending the latter as at 25 to underlie the base of the worm. Movement of the worm or threaded member 23 in an inward direction with reference to the stud is prevented by these portions abutting, for example, in the manner shown.

A plate 26 may close the bore of the stud or sleeve 20 and be provided with wing portions or extensions 27 which conveniently project into grooves 28 formed in the end of the worm 23. As indicated at 29 and similar to the structure at 25, the stud may be peened to secure the plate 26 against movements with respect to the worm and sleeve. In other words, the lower edge of sleeve 20 is upset or otherwise worked, as by peening, to cause the metal to overlie the lower annular edge of the opening in sleeve 20 and the outer marginal edge of plate 26. As a consequence of this structure or its functional equivalent, it is obvious that the stud 20 and plate 26 will be locked against relative rotation.

A spring 30 has one of its ends bearing against this plate 26 and is disposed within the bore of the stud. Its opposite end bears against a locking plate 31 which is shiftable axially of the stud. As illustrated especially in Figs. 4 and 5, it will be seen that this plate 31 conveniently includes a ring-shaped body 31', the inner edge of which has a diameter slightly in excess of the largest diameter of the stud body. A central plate portion 32 is provided and which lies within the bore of the stud. Connecting portions 33 extend within the slots 21 so as to properly support the outer portion of the plate for rotation with the stud and worm.

Now with a view to providing a locking or detent structure for the fastener assembly, it will be observed that the under face of the grommet 17, as well as the upper face of the plate 31, are both preferably corrugated. The corrugations conveniently take the form of an annular series of radially extending ribs 34 and 34A which are triangular in section and form a recess between each adjacent pair of ribs. The spring 30 normally serves to maintain the ribs on the plate and grommet in cooperating contact. Consequently, it follows that a mechanism is present which, in effect, locks the stud against accidental rotation and in virtually any desired position.

Thus assuming that the fastener parts are mounted in the manner shown in Figs. 1, 2, and 3 and moreover assuming that the main coupling between the parts is provided by a worm and worm receptacle as shown, it will be appreciated that the operator will primarily align the apertures of sheets 10 and 11. If mounting elements different from these sheets are employed, then the apertures will still be aligned so that the worm 23 is in registry with the aperture of the body 12 providing the receptacle. Under these circumstances, the worm and stud are locked or restrained from rotation with respect to the grommet or other parts mounting the same. By inserting a screw driver or other implement in the manipulating slot 35 or otherwise effecting relative rotation of the parts, the stud and worm may be turned. Such turning will cause the thread 24 to pass through the aperture 14 and have its convolutions engage the opposed lugs 15 and 16. Continued rotation will draw the sheets 10 and 11 or other mounting elements into intimate or any other desired relationship with respect to each other. During such turning of the parts the ribs 24 of the plate 31 will cam against the corresponding ribs of the grommet 17 or its equivalent. Relative separation of these surfaces is permitted by the spring 30 which allows axial movement of the plate 31 with respect to the stud and worm member. Consequently, the stud and worm will be locked and remain in any position to which they are shifted or rotated by the operator and without liability of accidental rotation subsequently occurring. In this connection it will be appreciated that as a consequence of providing annular series of closely spaced ribs 34 and 34A the fastener parts may be brought to virtually any desired position and, in effect, locked. Moreover, if foreign particles or dirt are interposed between the ribs 34 and 34A the parts will not be tilted so as to become inoperative. Rather, due to the large number of teeth or ribs, no detrimental result will obtain.

Furthermore, due to the large number of teeth and consequent extensive frictional area, a great restraint on accidental turning will be present. Additionally, it will be understood that due to the provision of the thread 24 any strains between the worm 23 and the worm receptacle 12 will be in an axial direction and the stud will not tend to cant or incline.

Now referring to Fig. 6, it will be seen that a worm receptacle has been illustrated and which may be employed in substitute of the worm receptacle heretofore illustrated. This receptacle or unit may include a body 36 provided with relatively extended portions having openings 37 through which securing or mounting members may extend. The body is centrally extended as indicated at 38. This extended or bulged portion may define at its outer edge a pair of opposed or double screw threads 39 and 40 which functionally correspond to the lugs 15 and 16. Obviously, such a unit will cooperate perfectly with a worm of the type designated at 23 or its equivalent.

Also as shown in Fig. 7, this worm receptacle or the receptacle heretofore described in connection with Figs. 1, 2, and 3, may be "floatingly" suspended. As illustrated in this figure, a pair of pins or rivets 41 may extend through the openings of the receptacle. These rivets mount springs 42 which may encircle their bodies and bear against the extended portions of the receptacle. The opposite ends of the springs bear against the heads 43. It will again be obvious that a unit of this type will cooperate in an entirely satisfactory manner with the worm mounted by the stud. In addition, it will be noted that due to the fact that the openings 37 are preferably of a larger diameter than the mounting members 41, the receptacle will tend to become automatically centered as the structure is projected. This will be particularly true as a "dished" guiding feature such as 38 is employed.

In common with the structures illustrated in Figs. 1 to 5, a fastener cooperating with receptacles or collars of the type shown in Figs. 6 and 7 will primarily require that the receptacle is aligned with the aperture of an element or sheet as heretofore described. Thereupon, the worm will be projected until the leading edges or ends of its double thread 24 lie adjacent the threads 39 and 40. Up to this point an accidental rotation of the stud and worm has been prevented. However, upon this assembly's being now deliberately rotated, the surfaces of the plate 31 and, for example, the grommet 17 will function in a manner which might be termed similar to a detent or pawl and ratchet assembly. In other words, the individual ribs will over-ride each other and the locking structure will, in effect, become inoperative.

During such action of the parts the receptacle and stud will shift axially with respect to each other. As a consequence of such shifting the mounting elements or plates will be drawn towards each other. This movement of the parts will continue until the plates or sheets are disposed in face to face contact. Only when such disposition of the parts occurs is the structure locked. Consequently, warpage of the sheets or plates—such as occurs incident to the locking of adjacent fasteners—is prevented. Also, in common with the structures as heretofore described it will be apparent, due to the providing of a relatively large number of ribs 34 and 34A, that even if a foreign particle comes to lie between the cooperating surfaces of the grommet and plate, it will not result in a canting of the parts to an extent such that the establishment of a proper locking function might be prevented. Rather, due to the relatively large area of the cooperating friction surfaces, an adequate safeguard against accidental rotation is provided. Also, it will be apparent that in the structure of Fig. 7 the stud may be rotated to any desired position to effect proper axial positioning of the receptacle with respect to the stud and the latter may thereupon be locked. In other words, it will be unnecessary to compromise the final desired position in order to effect an operation of the locking structure. This, as is obvious, is due to the great number of cooperating surfaces provided by the annular series of ribs.

Thus, among others, the several objects of the invention as specifically afore noted are achieved. Obviously, numerous changes in construction and rearrangements of the parts might be resorted to without departing from the spirit of the invention as defined by the claims.

I claim:

1. A locking means for a fastener stud, comprising a mounting grommet member for said stud and adapted for mounting on a structure, said grommet being provided with a plurality of corrugations on one face, a locking plate fixed against rotation with respect to and axially movable on said stud adjacent said grommet, a plurality of corrugations on said plate adjacent said grommet and for cooperative engagement with the grommet corrugations, and spring means continuously urging the locking plate into engagement with the grommet, whereby rotation of said stud is normally prevented, but, upon exertion of sufficient turning torque in either direction, axial movement of said plate occurs and rotation is permitted.

2. A locking means for a fastener stud, comprising a mounting grommet member for said stud and adapted for mounting on a structure, said grommet being provided on one face with a plurality of corrugations, a stud positioned rotatably within said grommet, said stud comprising a manipulating head and body, a locking plate fixed against rotation with respect to and axially movable on said body adjacent the corrugated side of said grommet, a plurality of corrugations on said plate adjacent said grommet and for cooperative engagement with the grommet corrugations, and means acting against said plate and continuously urging said plate and grommet into contact.

3. A locking means for a fastener stud comprising, a mounting grommet member for said stud adapted to be mounted in a sheet of material, said member being provided on its under face with a plurality of recesses, a stud positioned rotatably within said grommet member, said stud comprising a manipulating head and a sleeve provided with a central bore, the wall of said bore having opposed vertical slots therein, a locking plate positioned and axially movable on said sleeve and comprising an outer ring-shaped portion having on its upper surface facing the stud head a plurality of protrusions for cooperative engagement with the recesses of the grommet, and a resilient member disposed within said bore and acting against said locking plate and continuously urging the protrusions on said plate into the recesses in the grommet member.

4. A locking means for a fastener stud, comprising a mounting grommet member for said stud adapted to be mounted on a structure, said member being provided on its under-face with a plurality of recesses, a stud positioned rotatably within said grommet member, said stud comprising a manipulating head and a sleeve provided with a central bore, the wall of said bore having opposed vertical slots therein, a locking plate positioned and axially movable on said sleeve and comprising an outer ring-shaped portion, a diametrically-disposed portion connecting opposite sides of said ring-shaped portion and extending through said vertical slots, a plurality of protrusions on the upper surface of the ring-shaped portion for cooperative engagement with the recesses of the grommet, and a resilient member disposed within said bore and acting against the diametrically-disposed portion of said locking plate and continuously urging said plate protrusions into said recesses.

REX W. ALLEN.

REFERENCES CITED

The following references are of record in the file of this patent:

UNITED STATES PATENTS

| Number | Name | Date |
|---|---|---|
| 703,016 | Tash | June 24, 1902 |
| 842,450 | Ennis | Jan. 29, 1907 |
| 1,026,772 | Ries | May 21, 1912 |
| 1,369,754 | Nixon | Feb. 22, 1921 |
| 1,403,902 | Fields | Jan. 17, 1922 |
| 1,454,251 | Powell | May 8, 1923 |
| 1,652,575 | McGinley | Dec. 13, 1927 |
| 1,733,245 | Snelling | Oct. 29, 1929 |
| 1,843,423 | Hunt | Feb. 2, 1932 |
| 1,860,297 | Roberts | May 24, 1932 |
| 2,174,030 | Boyer | Sept. 26, 1939 |
| 2,323,260 | Venditty | June 29, 1943 |
| 2,335,823 | Herget | Nov. 30, 1943 |

FOREIGN PATENTS

| Number | Country | Date |
|---|---|---|
| 475,502 | France | Mar. 2, 1915 |
| 542,028 | Great Britain | Dec. 23, 1941 |
| 816,501 | France | May 3, 1937 |